(12) United States Patent
Harper et al.

(10) Patent No.: US 12,467,231 B2
(45) Date of Patent: Nov. 11, 2025

(54) CONTROL SYSTEM

(71) Applicant: J. C. Bamford Excavators Limited, Uttoxeter (GB)

(72) Inventors: Lee Harper, Uttoxeter (GB); Tom Rushton, Uttoxeter (GB)

(73) Assignee: J. C. Bamford Excavators Limited, Uttoxeter (GB)

(*) Notice: Subject to any disclaimer, the term of this patent is extended or adjusted under 35 U.S.C. 154(b) by 208 days.

(21) Appl. No.: 18/215,778

(22) Filed: Jun. 28, 2023

(65) Prior Publication Data
US 2023/0417020 A1 Dec. 28, 2023

(30) Foreign Application Priority Data

Jun. 28, 2022 (GB) ..................................... 2209470

(51) Int. Cl.
*E02F 9/20* (2006.01)
*B60L 15/20* (2006.01)
*B60L 50/60* (2019.01)
*E02F 9/26* (2006.01)

(52) U.S. Cl.
CPC .............. *E02F 9/207* (2013.01); *B60L 15/20* (2013.01); *B60L 50/60* (2019.02); *E02F 9/26* (2013.01); *B60L 2200/40* (2013.01); *B60L 2240/54* (2013.01); *B60L 2260/20* (2013.01)

(58) Field of Classification Search
CPC .. B60L 15/20; B60L 2200/40; B60L 2240/54; B60L 2260/20; B60L 3/0046; B60L 50/60; E02F 9/207; E02F 9/26
See application file for complete search history.

(56) References Cited

U.S. PATENT DOCUMENTS

| 11,832,553 | B2* | 12/2023 | Kraft | G05D 1/0088 |
| 11,836,131 | B1* | 12/2023 | Gronowski | G01C 21/3841 |
| 2004/0062963 | A1 | 4/2004 | Umayahara et al. | |
| 2007/0090937 | A1 | 4/2007 | Stabler | |
| 2007/0164693 | A1* | 7/2007 | King | B60L 7/24 318/109 |

(Continued)

FOREIGN PATENT DOCUMENTS

| CN | 102466486 A | 5/2012 |
| EP | 3666584 A1 | 6/2020 |

(Continued)

OTHER PUBLICATIONS

Extended European Search Report for European Patent Application No. 23182188.5, dated Nov. 23, 2023.

(Continued)

*Primary Examiner* — Tyler J Lee
(74) *Attorney, Agent, or Firm* — MARSHALL, GERSTEIN & BORUN LLP

(57) ABSTRACT

A control system for an off-highway working machine includes a ground engaging propulsion structure for propelling the working machine, a body supported on the ground engaging propulsion structure, a drive arrangement, and a transmission operable to transmit drive to the ground engaging propulsion structure. The control system calculates a travel energy threshold required to enable the working machine to travel to the charging location, and provide an alert based on the travel energy threshold.

19 Claims, 9 Drawing Sheets

(56) References Cited

U.S. PATENT DOCUMENTS

| | | | |
|---|---|---|---|
| 2011/0032110 A1 | 2/2011 | Taguchi | |
| 2012/0191289 A1 | 7/2012 | Guo et al. | |
| 2017/0240160 A1* | 8/2017 | Park | B60W 10/08 |
| 2021/0206290 A1 | 7/2021 | Li et al. | |
| 2021/0252995 A1 | 8/2021 | Rocholl et al. | |
| 2021/0268927 A1* | 9/2021 | Shimonishi | H01M 10/4207 |
| 2021/0316713 A1 | 10/2021 | Vilar et al. | |
| 2021/0404838 A1* | 12/2021 | Naito | B60L 58/12 |
| 2022/0107194 A1 | 4/2022 | Hagström et al. | |
| 2022/0185317 A1 | 6/2022 | Kraft et al. | |
| 2022/0242213 A1* | 8/2022 | Bartz | B60Q 9/00 |
| 2022/0379770 A1* | 12/2022 | Salter | H02J 3/001 |

FOREIGN PATENT DOCUMENTS

| | | |
|---|---|---|
| EP | 3428025 B1 | 4/2021 |
| EP | 3950404 A1 | 2/2022 |
| JP | H08-240435 A | 9/1996 |
| JP | 2009-256988 A | 11/2009 |
| JP | 2020-125625 A | 8/2020 |

OTHER PUBLICATIONS

Examination Report issued in GB2209470.0, dated Aug. 2, 2024.
Search and Examination Report for GB 2209479.0, dated Dec. 5, 2022.
Combined Search and Examination Report, GB Patent Application No. 2309767.8, dated Nov. 29, 2023.
Examination Report, GB Patent Application No. 2309767.8, dated Aug. 2, 2024.
Examination Report, GB Patent Application No. 2309767.8, dated May 1, 2025.

* cited by examiner

CONTROL SYSTEM

FIELD

The present teachings relate to a control system for a working machine such as an electric off-highway working machine, an electric off-highway working machine, and to a method of providing an alert for an electric off-highway working machine.

BACKGROUND

Off-highway vehicles or working machines are for example those used in construction industries (e.g. backhoe loaders, slew excavators telescopic handlers, forklifts, skid-steer loaders, dump trucks, bulldozers, graders), agricultural industries (tractors, combine harvesters, self-propelled harvesters and sprayers), quarrying (e.g. loading shovels, aggregate crushing equipment), and forestry (timber harvesters, feller bunchers). Such working machines may typically include a number of actuatable devices or components, and a hydraulically driven ground engaging structure such as wheels or a pair of endless tracks. Depending on the particular working machine, a range of different actuatable devices may be provided, such as a working arm, stabilizer legs, a dozer blades, hydraulically powered steering.

Working machines are typically diesel powered. However, there is a drive in the industry to move towards electric and hydrogen-powered working machines, in which electricity or hydrogen respectively provide a source of power to drive the working machine and to operate the devices. During operation of the working machines, they will often need to be recharged (i.e. recharged with electricity or refuelled with hydrogen) at a worksite at various times during the workday. In such working machines, it is desirable that none of these machines are allowed to fully discharge their battery or deplete their store of onboard hydrogen such that productivity on the worksite is maintained.

The present teachings seek to overcome or at least mitigate one or more problems associated with the prior art.

SUMMARY

A first aspect of the teachings provides for a control system for an electric off-highway working machine comprising a ground engaging propulsion structure for propelling the working machine, a body supported on the ground engaging propulsion structure, a drive arrangement comprising an energy source, a prime mover, and a transmission operable to transmit drive from the prime mover to the ground engaging propulsion structure, the control system comprising a controller configured to: receive data relating to a charging location; receive data relating to a location of the working machine; calculate a travel energy threshold required to enable the working machine to travel to the charging location; receive data relating to a level of the energy source of the working machine; compare the travel energy threshold to the level of the energy source; and provide an alert when the level of the energy source is equal, e.g. substantially equal, to the travel energy threshold.

In one arrangement, the working may comprise an energy source in the form of a battery, and the prime mover may be an electric motor. The control system may be configured to receive data relating to a state of charge of the battery, and to compare the compare the travel energy threshold to the state of charge of the battery.

This configuration of the control system helps to monitor the level of charge of the battery relative to the energy required to travel back to a charge point. This helps to reduce the risk of these electric off-highway working machines being allowed to go fully discharge so as to have insufficient energy to return to a charge point.

In one arrangement, the energy source may be a hydrogen fuel cell, and the prime mover may be an electric motor. The control system may be configured to receive data relating to a state of charge of the fuel cell, and to compare the compare the travel energy threshold to the state of charge of the fuel cell.

In one arrangement, the energy source may be a diesel or hydrogen, and the prime mover may be an internal combustion engine. The control system may be configured to receive data relating to an amount of diesel or hydrogen remaining in a fuel tank.

The control system may be configured to provide an alert when the state of charge of the battery is equal to or less than the travel energy threshold.

This configuration alerts an operator of the electric off-highway working machine of the need to stop performing the current working operation and to return the working machine to the charger. In this way, an operator is alerted when the machine is about to be of range of charger.

The control system may be configured to determine a distance to the charging location, and to calculate the travel energy threshold required based on the determined distance to the charging location.

The control system may be configured to receive data relating to the location of the working machine from a position sensor provided on the working machine.

Enables distance to the charging location to be measured to calculate the energy threshold.

The control system may be configured to store the XY coordinates of a route travelled by the working machine from the charging location, and to determine the distance to the charging location based on the route travelled.

More accurate determination of distance to charging point—enables a more accurate determination of energy requirement and so the energy threshold at which the alert is provided. This in turn enables an operator to spend more time performing work functions prior to having to return the working machine to the charging point.

The control system may be configured to receive data relating to the altitude of the working machine relative to an altitude of the charging point, and to determine the distance to the charging location based on the based on the altitude of the working machine relative to an altitude of the charging point.

More accurate determination of distance to charging point—enables a more accurate determination of energy requirement and so the energy threshold at which the alert is provided. This in turn enables an operator to spend more time performing work functions prior to having to return the working machine to the charging point.

The control system may be configured activate a restricted operation mode of the working machine when the state of charge of the battery is below the travel energy threshold by a first predetermined amount.

The control system may be configured activate a restricted operation mode of the working machine when the state of charge of the battery is substantially equal to a second energy threshold, which is less than the travel energy threshold.

Restricting operation of the working machine reduces the machine's energy usage and enables the working machine to travel to the charge location even when the state of charge of the battery is below the energy requirement.

The control system may be configured to activate a limp home operation mode when the state of charge of the battery is below the travel energy threshold by a second predetermined amount, greater than the first predetermined amount.

The control system may be configured activate a limp home operation mode when the state of charge of the battery is substantially equal to a third energy threshold, which is less than the travel energy threshold and the second energy threshold.

In the limp home operation mode, the RPM of the electric motor is fixed at a relatively low RPM. In this way, only basis operation of the working machine is possible, thus reducing energy usage while enabling the operator to return the working machine to the charge point.

The control system may be configured to determine a travel energy requirement based on the distance to the charging location and an estimated energy consumed per unit distance, and wherein the travel energy threshold is based on, and is greater than, the travel energy requirement.

This additional energy provides an additional safety factor in the state of charge of the battery at which the alert is provided, to take account for different route that may need to be taken, and/or differing conditions such as ambient temperature, ground conditions, altitude etc.

The travel energy threshold may be in the region of 110-130% of the travel energy requirement, for example approximately 120% of the travel energy requirement.

This has been found to provide the optimal balance between maximizing time on site performing working operations and ensuring that the working vehicle is able to safely return to the charging location.

The control system may be configured to retrieve data relating to the estimated energy consumed per unit distance from a memory for a configuration of the working machine selected by an operator.

The working machine may comprise an operator input to select a particular configuration of the working machine, and the control system is configured to receive a signal based on the operator selection.

This tailors the travel energy threshold to the particular configuration of the working machine, helping to maximize time on site performing working operations.

The control system may be configured to monitor an electrical energy usage of the working machine in a travelling mode over a predetermined period of time, and to calculate the estimated energy consumed per unit distance the electrical energy usage.

This tailors the travel energy threshold to the particular configuration of the working machine and the conditions (e.g. ambient temperature, terrain etc.) in which the machine is operation, helping to maximize time on site performing working operations.

The control system may be configured to monitor the electrical energy usage in the travelling mode since the battery was last charged.

The control system may be configured to detect a signal whether the working machine is in a travelling mode based on one or more of: detecting when the working machine is travelling above a predetermined travel speed; movement of the working machine beyond a predetermined distance in one direction; an orientation or position of an operator seat (e.g. movement between a rearward facing position to a forward facing position); and/or detecting a ground engaging component (e.g. stabilizer legs or a dozer blade) of the working machine has moved from a ground engaging position to a raised position.

The control system may be configured to monitor energy usage of the working machine in a working mode, and to provide an estimated time remaining before the alert is provided.

The control system may be configured to detect a signal whether the working machine is in a working mode based on one or more of: detecting when the working machine is travelling below a predetermined travel speed; an orientation or position of an operator seat (e.g. movement between a rearward facing position to a forward facing position); and/or detecting a ground engaging component (e.g. stabilizer legs or a dozer blade) of the working machine has moved to a ground engaging position from a raised position.

The alert may comprise an audio and/or visual alert.

The control system may be configured to receive data relating to the charging location via a global navigation satellite system (GNSS) such as the global positioning system (GPS).

The control system may be configured to receive data relating to the charging location by retrieving charging location data stored on a memory when the battery of the working machine was last charged.

The control system may be configured to calculate the travel energy threshold based on data relating to an ambient temperature received from an ambient temperature sensor on the working machine.

The control system may be configured to receive data relating to a plurality of charging locations, and select one of the plurality of charging locations as the charging location.

The control system may be configured to select one of the plurality of charging locations as the charging location based on one or more of: a distance to each of the plurality of charging locations; an altitude of the working machine relative to each of the plurality of charging locations; and a charging rate at each of the plurality of charging locations.

The control system may be configured to receive data relating to each of the plurality of charging locations being in an active charging state or a rest state, and to select one of the plurality of charging locations as the charging location based on the active state or rest state of each of the plurality of charging locations.

According to a second aspect of the teachings, an off-highway working machine comprising: a ground engaging propulsion structure for propelling the working machine; a body supported on the ground engaging propulsion structure; a drive arrangement comprising an energy source, a prime mover, and a transmission operable to transmit drive from the prime mover to the ground engaging propulsion structure; and a control system configured to retrieve information relating to a comparison between a travel energy threshold and an energy remaining in the energy source from a memory provided on the working machine or a remote server, and wherein the control system is configured to provide an alert based on the comparison between the energy remaining in the energy source and the travel energy threshold.

The working machine may be an electric off-highway working machine.

The drive arrangement may comprise an energy source in the form of a battery, and prime mover in the form of an electric motor. The control system may be configured to retrieve information relating to a state of charge of the battery.

In one arrangement, the energy source may be diesel or hydrogen, and the prime mover may be an internal combustion engine. The control system may be configured to receive data relating to an amount of diesel or hydrogen remaining in a fuel tank.

The control system may be configured to: receive data relating to the charging location; determine a distance to the charging location; determine an energy requirement of the working machine to travel to the charging location; and to compare the energy requirement to a state of charge of the battery.

The electric off-highway working machine may comprise one or more actuatable device selected from one or more of: a working arm mounted to the body; and/or at least one stabilizer leg mounted to the body; and/or a dozer blade mounted to the body; and/or a container pivotally mounted to the body; and/or a working implement such as a bucket, a shovel, or forks.

The body may comprise an undercarriage supported on the ground engaging structure and a superstructure mounted to the undercarriage, optionally wherein the superstructure is rotatably mounted to the undercarriage.

The ground engaging propulsion structure may comprise front and rear pairs of wheels or a pair of endless tracks.

The electric off-highway working machine may comprise a sensor configured to provide data in relation to the ambient temperature, and wherein the travel energy threshold is based on the ambient temperature.

It will be appreciated that the second aspect may comprise one or more of the features of the first aspect.

According to a third aspect, there is provided a method for providing an alert for an electric off-highway working machine comprising a ground engaging propulsion structure for propelling the working machine, a body supported on the ground engaging propulsion structure, a drive arrangement comprising an energy source, a prime mover configured to be powered by the energy source, and a transmission operable to transmit drive from the prime mover to the ground engaging propulsion structure, the method comprising: receiving data relating to a charging location; receiving data relating to a location of the working machine; calculating a travel energy threshold required to enable the working machine to travel to the charging location; receiving data relating to an energy remaining in the energy source of the working machine; comparing the travel energy threshold to the energy remaining in the energy source; and providing an alert when the energy remaining in the energy source is equal, e.g. substantially equal, to the travel energy threshold.

The method may comprise determining a distance to the charging location.

The drive arrangement may comprise an energy source in the form of a battery, and prime mover in the form of an electric motor. The method may comprise receiving information relating to a state of charge of the battery.

The method may comprise: receiving data relating to a plurality of charging locations; and selecting one of the plurality of charging locations as the charging location.

The method may comprise: determining a distance to each of the plurality of charging locations; and selecting one of the plurality of charging locations as the charging location based on the determined distance to each of the plurality of charging locations.

The method may comprise: receiving data in relation to an altitude of the working machine relative to an altitude of each of the plurality of charging locations; and selecting one of the plurality of charging locations as the charging location based on the altitude of the working machine relative to each of the plurality of charging locations.

The method may comprise: receiving data relating to one or more charging parameters indicative of a charging rate at each of the plurality of charging locations; and selecting one of the plurality of charging locations as the charging location based on the charging rate at each of the plurality of charging locations.

The method may comprise: receiving data relating to each of the plurality of charging locations being in an active charging state or a rest state; and selecting one of the plurality of charging locations as the charging location based on the active state or rest state of each of the plurality of charging locations.

It will be appreciated that the third aspect may comprise one or more of the features of the first aspect and/or the second aspect.

A fourth aspect of the present teachings provides for a control system for a hydrogen-powered off-highway working machine comprising a ground engaging propulsion structure for propelling the working machine, a body supported on the ground engaging propulsion structure, a drive arrangement comprising a fuel tank for storing hydrogen fuel, a prime mover configured to be supplied with hydrogen from the fuel tank, and a transmission operable to transmit drive from the prime mover to the ground engaging propulsion structure. The control system comprises a controller configured to: receive data relating to a charging location for refuelling the fuel tank with hydrogen fuel; receive data relating to a location of the working machine; calculate a travel energy threshold required to enable the working machine to travel to the charging location, said travel energy threshold corresponding to a fuel level threshold of the fuel tank; receive data relating to a fuel level of the fuel tank of the working machine; compare the fuel level threshold to the fuel level of the fuel tank; and provide an alert when the fuel level of the fuel tank is equal, e.g. substantially equal, to the fuel level threshold.

The control system may be configured to provide an alert when the fuel level of the fuel tank is equal to or less than the fuel level threshold.

The control system may be configured to determine a distance to the charging location. The control system may be configured to calculate the fuel level threshold based on the determined distance to the charging location.

The control system may be configured to receive data relating to the location of the working machine from a position sensor provided on the working machine.

The control system may be configured to store the XY coordinates of a route travelled by the working machine from the charging location. The control system may be configured to determine the distance to the charging location based on the route travelled.

The control system may be configured to receive data in relation to an altitude of the working machine relative to an altitude of the charging location. The control system may be configured to determine the distance to the charging location based on the altitude of the working machine relative to an altitude of the charging location.

The control system may be configured to receive data relating to a plurality of charging locations. The control system may be configured to select one of the plurality of charging locations as the charging location.

The control system may be configured to determine a distance to each of the plurality of charging locations. The control system may be configured to select one of the plurality of charging locations as the charging location based on the distance to each of the plurality of charging locations.

The control system may be configured to receive data in relation to an altitude of the working machine relative to an altitude of each of the plurality of charging locations. The control system may be configured to select one of the plurality of charging locations as the charging location based on the altitude of the working machine relative to each of the plurality of charging locations.

The control system may be configured to receive data relating to one or more charging parameters indicative of a charging rate at each of the plurality of charging locations. The control system may be configured to select one of the plurality of charging locations as the charging location based on the charging rate at each of the plurality of charging locations.

The control system may be configured to receive data relating to one or more hydrogen fuel pressures at each of the plurality of charging locations. The control system may be configured to select one of the plurality of charging locations as the charging location based on the hydrogen fuel pressures.

The control system may be configured to compare the one or more hydrogen fuel pressures at each of the plurality of charging locations to a hydrogen fuel pressure of the fuel tank of the working machine.

The control system may be configured to receive data relating to each of the plurality of charging locations being in an active charging state or a rest state. The control system may be configured to select one of the plurality of charging locations as the charging location based on the active state or rest state of each of the plurality of charging locations.

The control system may be configured to activate a restricted operation mode of the working machine when the fuel level of the fuel tank is below the fuel level threshold by a first predetermined amount.

The working machine may comprise one or more hydraulically actuatable working implements for performing working operations. The control system may be configured to restrict or prevent operation of the working implements in the restricted mode of operation.

The control system may be configured to determine a travel fuel requirement based on the distance to the charging location and an estimated fuel consumed per unit distance. The fuel level threshold may be based on the travel fuel requirement. The fuel level threshold may be greater than the travel fuel requirement.

The control system may be configured to monitor fuel usage of the working machine in a working mode. The control system may be configured to provide an estimated time remaining before the alert is provided.

The control system may be configured to detect a signal whether the working machine is in a working mode based on one or more of: detecting when the working machine is travelling below a predetermined travel speed; an orientation or position of an operator seat (e.g. movement between a rearward facing position to a forward facing position); and/or detecting a ground engaging component (e.g. stabilizer legs or a dozer blade) of the working machine has moved to a ground engaging position from a raised position.

The alert may comprise an audio and/or visual alert.

The control system may be configured to receive data relating to the charging location via a global navigation satellite system (GNSS) such as the global positioning system (GPS).

The control system may be configured to receive data relating to the charging location by retrieving charging location data stored on a memory when the fuel tank of the working machine was last refuelled with hydrogen.

It will be appreciated that the fourth aspect may comprise one or more of the features of the first aspect, the second aspect, and/or the third aspect.

A fifth aspect of the present teachings provides for a hydrogen-powered off-highway working machine comprising: a ground engaging propulsion structure for propelling the working machine; a body supported on the ground engaging propulsion structure; a drive arrangement comprising a fuel tank for storing hydrogen fuel; a prime mover configured to be supplied with hydrogen from the fuel tank; a transmission operable to transmit drive from the prime mover to the ground engaging propulsion structure; and a control system configured to retrieve information relating to a comparison between a fuel level threshold and a fuel level of the fuel tank from a memory provided on the working machine or a remote server. The control system is configured to provide an alert based on the comparison between the fuel level of the fuel tank and the fuel level threshold.

The control system may be configured to: receive data relating to the charging location; determine a distance to the charging location; determine a fuel requirement of the working machine to travel to the charging location; and to compare the fuel requirement to the fuel level of the fuel tank.

The prime mover may be a hydrogen internal combustion engine; or an electric motor powered by a hydrogen fuel cell.

The hydrogen-powered off-highway working machine may comprise one or more actuatable device selected from one or more of: a working arm mounted to the body; and/or at least one stabilizer leg mounted to the body; and/or a dozer blade mounted to the body; and/or a container pivotally mounted to the body; and/or a working implement such as a bucket, a shovel, or forks.

It will be appreciated that the fifth aspect may comprise one or more of the features of the first aspect, the second aspect, the third aspect, and/or the fourth aspect.

A sixth aspect of the present teachings provides for a method for providing an alert for a hydrogen-powered off-highway working machine comprising a ground engaging propulsion structure for propelling the working machine, a body supported on the ground engaging propulsion structure, a drive arrangement comprising a fuel tank for storing hydrogen fuel, a prime mover configured to be supplied with hydrogen from the fuel tank, and a transmission operable to transmit drive from the prime mover to the ground engaging propulsion structure. The method comprises:

receiving data relating to a charging location for refuelling the fuel tank with hydrogen;

receiving data relating to a location of the working machine;

determining a distance to the charging location;

calculating a travel energy threshold required to enable the working machine to travel to the charging location, said travel energy threshold corresponding to a fuel level threshold of the fuel tank;

receiving data relating to a fuel level of the fuel tank of the working machine;

comparing the fuel level threshold to the fuel level of the fuel tank; and providing an alert when the fuel level of the fuel tank is equal, e.g. substantially equal, to the fuel level threshold.

The method may comprise determining a distance to the charging location.

The method may comprise: receiving data relating to a plurality of charging locations; and selecting one of the plurality of charging locations as the charging location.

The method may comprise: determining a distance to each of the plurality of charging locations; and selecting one of the plurality of charging locations as the charging location based on the determined distance to each of the plurality of charging locations.

The method may comprise: receiving data in relation to an altitude of the working machine relative to an altitude of each of the plurality of charging locations; and selecting one of the plurality of charging locations as the charging location based on the altitude of the working machine relative to each of the plurality of charging locations.

The method may comprise: receiving data relating to one or more charging parameters indicative of a charging rate at each of the plurality of charging locations; and selecting one of the plurality of charging locations as the charging location based on the charging rate at each of the plurality of charging locations.

The method may comprise: receiving data relating to one or more hydrogen fuel pressures at each of the plurality of charging locations; and selecting one of the plurality of charging locations as the charging location based on the hydrogen fuel pressures.

The method may comprise: comparing the one or more hydrogen fuel pressures at each of the plurality of charging locations to a hydrogen fuel pressure of the fuel tank of the working machine.

The method may comprise: receiving data relating to each of the plurality of charging locations being in an active charging state or a rest state; and selecting one of the plurality of charging locations as the charging location based on the active state or rest state of each of the plurality of charging locations.

It will be appreciated that the sixth aspect may comprise one or more of the features of the first aspect, the second aspect, the third aspect, the fourth aspect, and/or the fifth aspect.

BRIEF DESCRIPTION OF THE DRAWINGS

Embodiments will now be described with reference to the accompanying drawings, in which.

DETAILED DESCRIPTION

Figure 1:
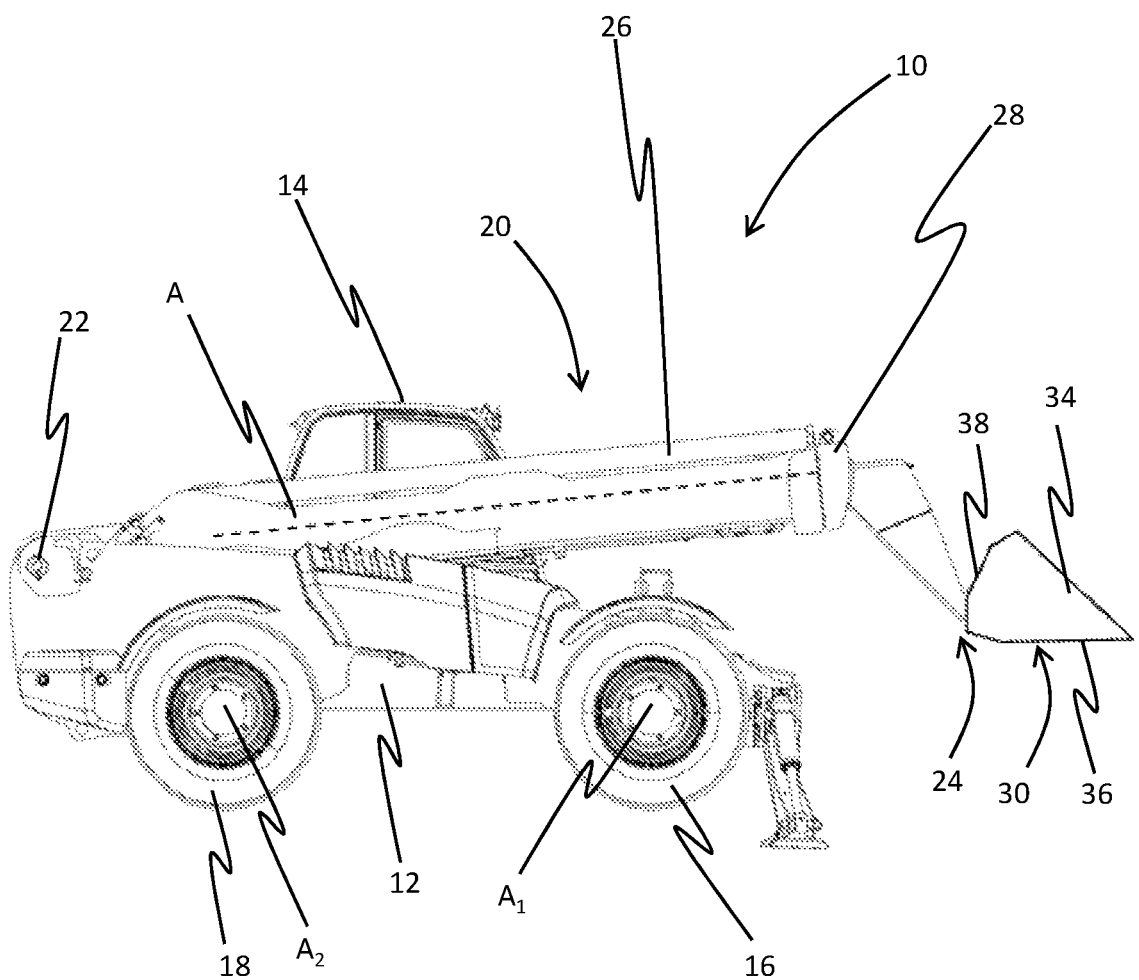
FIG. 1 is a side view of a working machine according to an embodiment of the present teachings.
Figure 2:
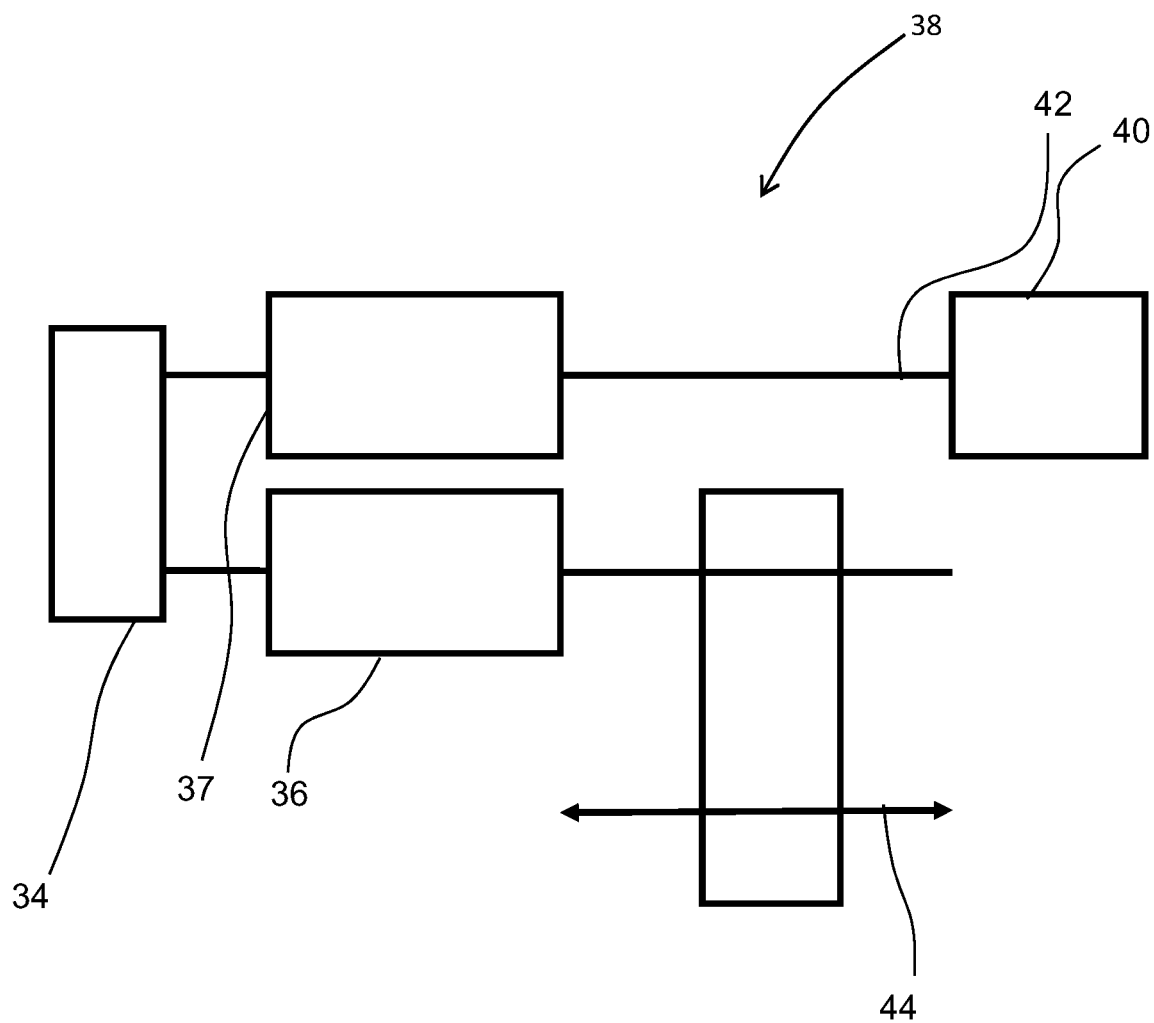
FIG. 2 is a schematic representation of a drive arrangement of the working machine of FIG. 1.

Referring firstly to FIGS. 1 and 2, an embodiment of the teachings includes a working machine 10. The working machine may be a load handling machine. In this embodiment, the working machine 10 is a telescopic handler. In other embodiments the working machine 10 may be any working machine including a working arm 20, such as a rotating telescopic handler, an excavator, a skid-steer loader, or a telescopic wheel loader, for example. Such working machines may be denoted as off-highway vehicles or as non-road mobile machinery. In further embodiments, the working machine 10 may be a dumper vehicle or a tractor.

The working machine 10 includes a machine body 12. The machine body 12 may include, for example, an operator's cab 14 from which an operator can operate the machine 10. The operator cab 14 may be mounted on the body 12 so as to be offset from a center of the body. Although in alternative arrangements, the cab 14 may be substantially central, or may be omitted.

The working machine 10 has a ground engaging propulsion arrangement. The ground engaging propulsion arrangement or structure supports the body 12. The ground engaging propulsion structure includes a first, or front, axle A1 and a second, or rear, axle A2, each axle being coupled to a pair of wheels 16, 18. In other embodiments, the ground engaging propulsion structure may include a pair of endless tracks. One or both of the axles A1, A2 may be coupled to a drive arrangement (not shown) configured to provide motive power to the ground engaging propulsion structure (i.e. the axles A1, A2). The drive arrangement causes movement of the working machine 10 over a ground surface.

A working arm 20 is pivotally connected to the body 12 so as to be inclinable relative to the body 12. The working arm 20 is connected to the body 12 by a mount 22 proximate a first end, or proximal end, of the working arm 20. In some arrangements, the body 12 may include an undercarriage or chassis including the ground engaging propulsion arrangement, and a superstructure including the cab and arm. The superstructure may be rotatable (e.g. about a substantially vertical axis) relative to the undercarriage/chassis. Put another way, the superstructure may be rotatable relative to the ground engaging propulsion structure. It will be appreciated that the mount 22 may be provided on the undercarriage/chassis or the superstructure in embodiments including an undercarriage and superstructure.

The working arm 20 may be a telescopic arm. The telescopic arm 20 includes a plurality of sections, which are configured to be telescopically extendable. The sections are extendable by an actuator (not shown). The length of the telescopic arm 20 is adjustable between a retracted position and an extended position. In the illustrated embodiment, the working arm 20 includes a first section 26 connected to the body 12 (i.e. the mount 22) and a second section 28 which is telescopically fitted to the first section 26. In this embodiment, the second section 28 of the working arm 20 is telescopically moveable with respect to the first section 26 such that the working arm 20 can be extended and retracted along an elongate axis A of the arm 20. In alternative embodiments (not shown), the working arm 20 may include more than two sections, for example three, four or more sections. Each arm section may be telescopically fitted to at least one other section, and an actuator may be provided therebetween. The working arm 20 is inclinable or pivotable relative to the machine body 12. The working arm 20 is inclinable about a substantially transverse axis located at the mount 22. Rotational movement of the working arm 20 about said transverse axis with respect to the machine body 12 is achieved by use of an actuator (not shown) that is coupled between the arm and the body 12. Movement of the working arm 20, e.g. pivoting and extension/retraction, is operable via an actuator (not shown), and so the working arm 20 is an actuatable device or component. It will be appreciated that the actuator may be a hydraulic actuator or an electric actuator.

The working arm 20 has a working implement 30 mounted at the distal end thereof. In the illustrated embodiment, the working implement 30 is a bucket, but in alternative arrangements any suitable working implement may be used such as forks, a shovel, a sweeper, a grapple etc. The bucket 30 is pivotable relative to the working arm 20. The bucket 30 is pivotable about an axis orthogonal to the elongate axis A of the working arm 20. The bucket 30 is pivoted by a second actuator (not shown) that is coupled between the bucket 30 and the arm Movement or operation of the working implement 30, e.g. bucket curl/dump, pivoting etc., is operable via an actuator (not shown), and so the working implement 30 is an actuatable device or component. It will be appreciated that the actuator may be a hydraulic actuator or an electric actuator.

The working machine 10 is provided with a pair of stabilizing legs 32. The stabilizing legs 32 are provided on the body 12 of the working machine 10. Raising and lowering of the stabilizer legs 32 is operable via an actuator (not shown), and so the stabilizer legs 32 are an actuatable device or component. It will be appreciated that the actuator may be a hydraulic actuator or an electric actuator. Further examples of actuatable devices or components of a working machine that are not illustrated are: a pivotable container or skip; and a dozer blade pivotally mounted to the body.

Referring to FIG. 2, a drive arrangement of the working machine 10 is illustrated. The drive arrangement includes an energy source, a prime mover, and a transmission 38.

In the illustrated arrangement, the working machine 10 includes an energy source in the form of an electrical source of power 34. In the present arrangement, the electrical source of power 34 is a battery. The battery 34 provides power to a prime mover. The working machine includes a prime mover in the form of an electric motor arrangement. The electric motor arrangement is configured to provide power the actuatable devices or components of the working machine 10 and to drive the ground engaging propulsion system.

The illustrated embodiment, power is provided to the working machine 10 by the battery via one or more electric motors. In some alternative arrangements, the one or more electric motors may be powered by a hydrogen fuel cell, or any other alternative source of power. In further alternative arrangements, it will be appreciated that the working machine 10 may be provided with an energy source in the form of diesel or hydrogen fuel and a primer mover in the form of a hydrogen internal combustion engine. In some arrangements, the working machine may be a hybrid working machine comprising both an internal combustion engine and an electric motor. In yet further alternative arrangements, the one or more electric motors may be powered by any other alternative source of power, or the working machine 10 may be provided with an energy source in the form of diesel and a primer mover in the form of a diesel internal combustion engine.

The electric motor arrangement includes a first electric motor 36 and a second electric motor 37. The first electric motor 36 is configured to drive the ground engaging structure 32 to propel the working machine 10. The second electric motor 37 is configured to drive a hydraulic pump 40 to power the actuatable devices (i.e. in the present arrangement, the actuatable devices are hydraulically actuatable devices). In order to transmit drive to the hydraulic pump the transmission 38 includes a first output member 42 connected to the hydraulic pump 40, and a second output member 44 connected to the ground engaging structure. In alternative arrangements, however, it will be appreciated that the hydraulic pump 40 and the ground engaging propulsion system may be driven by the same electric motor.

Figure 3:
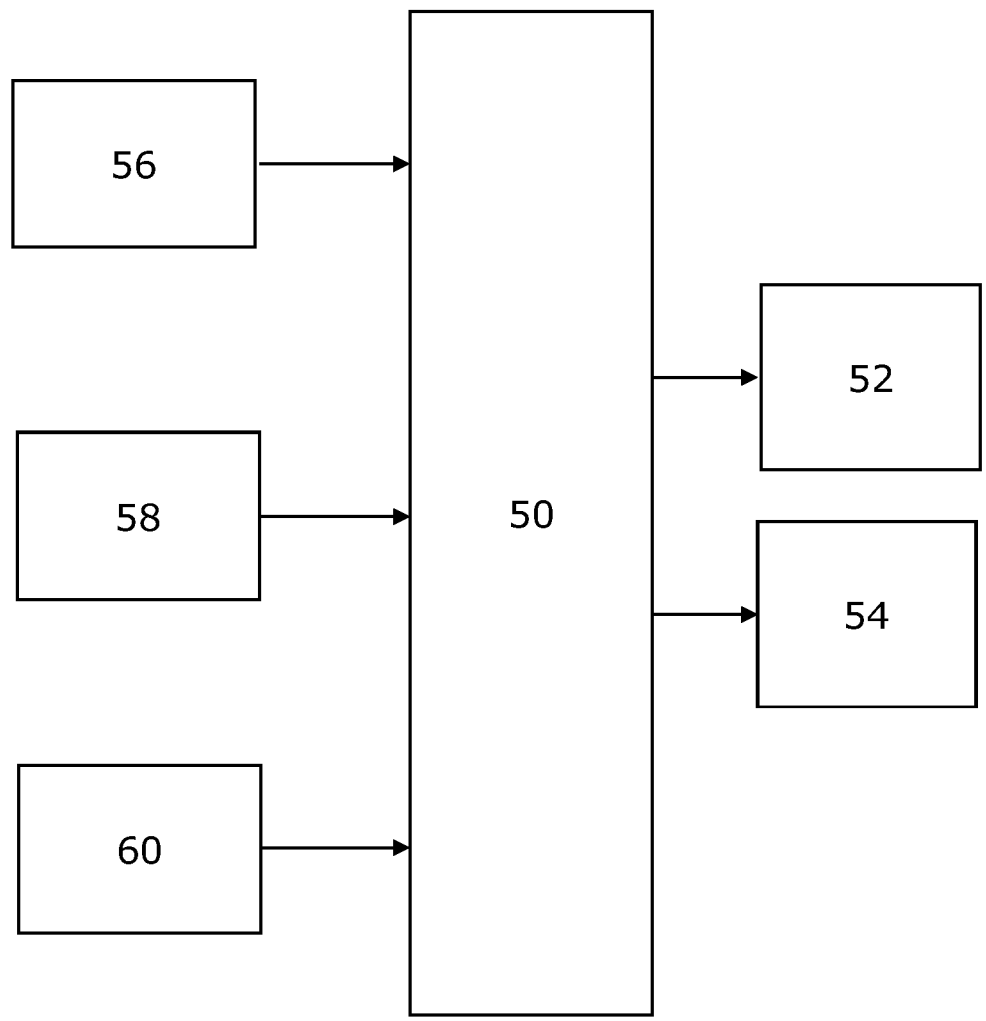
FIG. 3 is a block diagram of a control system of the working machine of FIG. 1.
Figure 4:
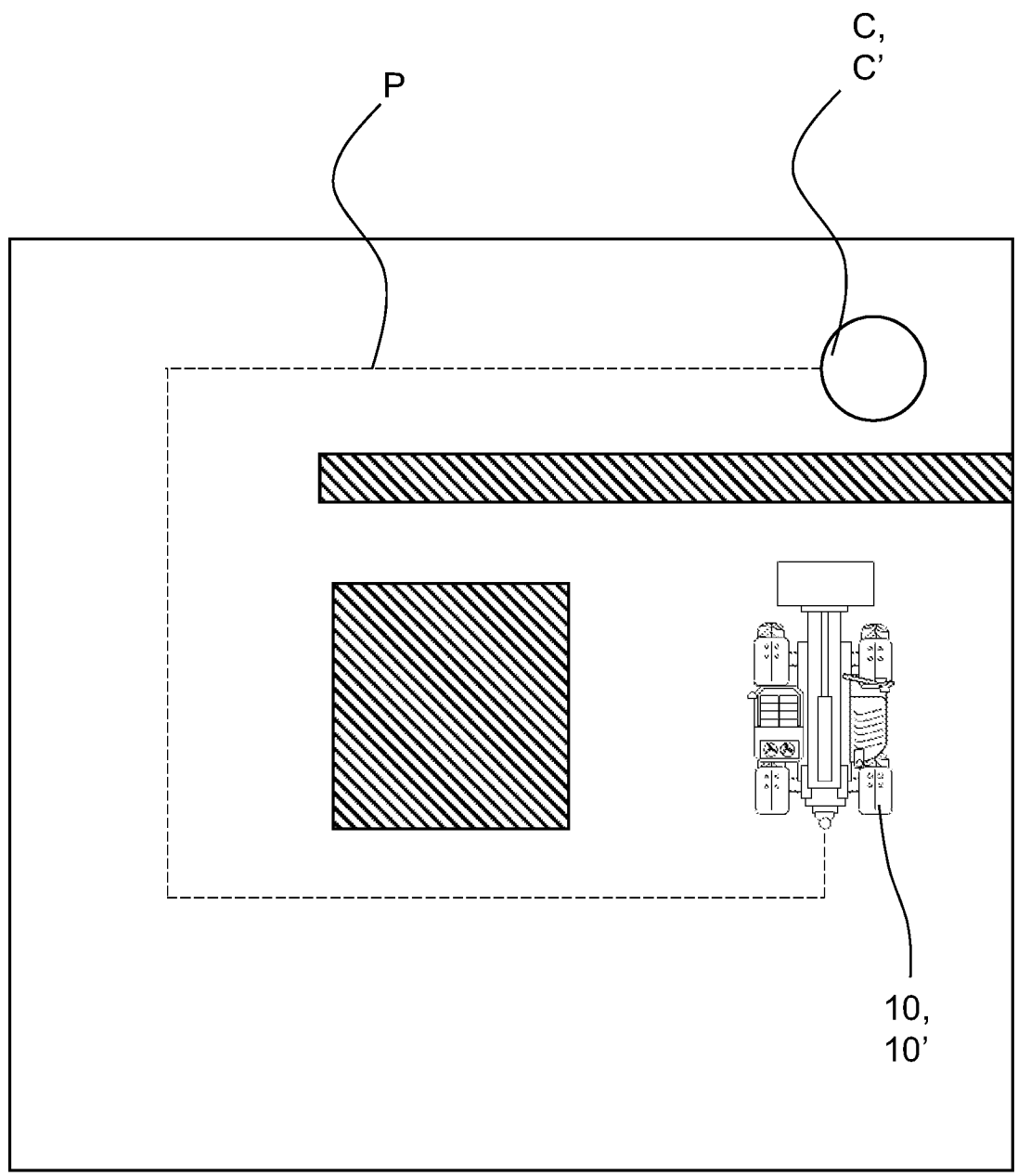
FIG. 4 is a schematic view of the working machine of FIG. 1 on a worksite.
Figure 5:
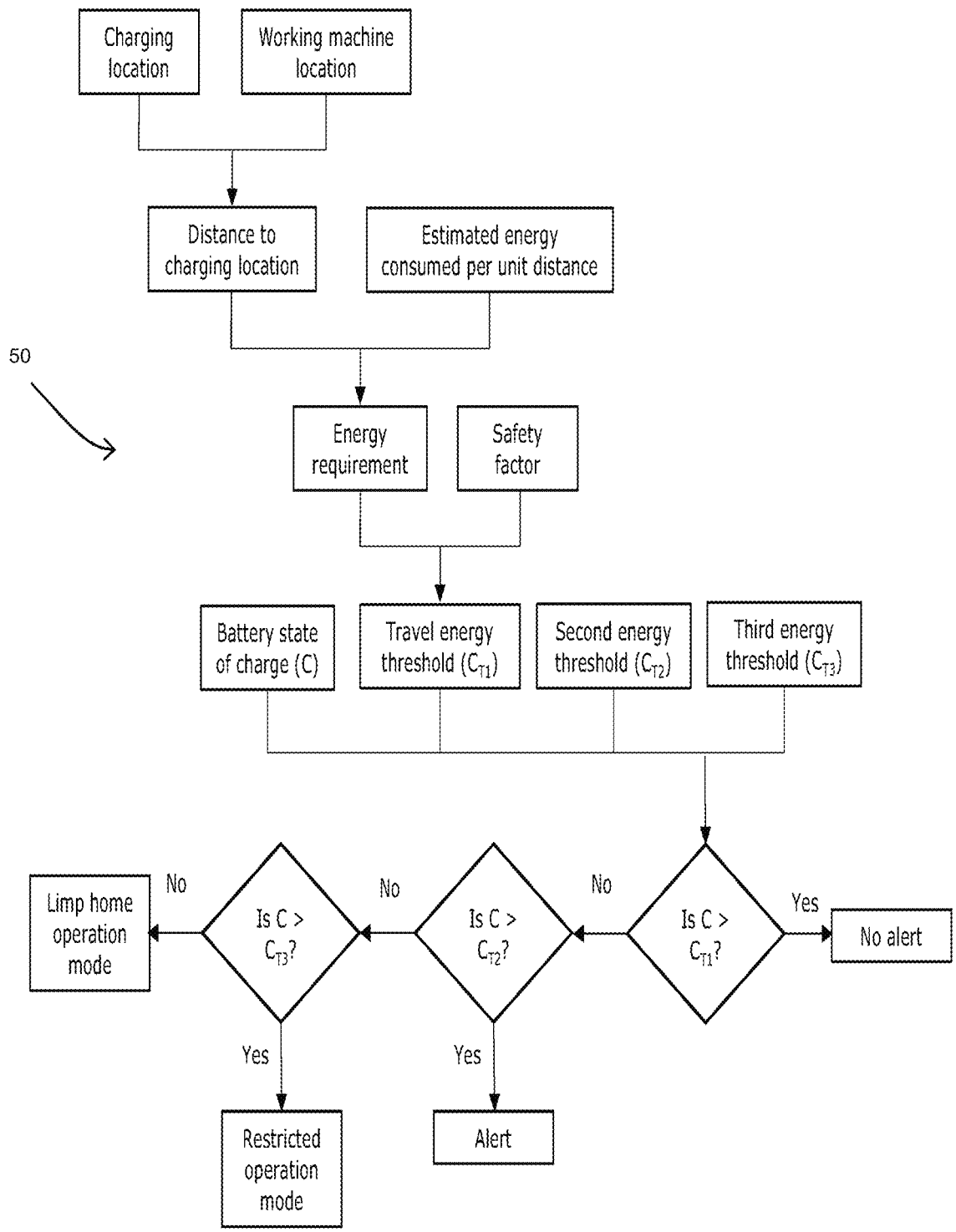
FIG. 5 is a control logic diagram for providing an alert to an operator of the working machine of FIG. 1.
Figure 6:
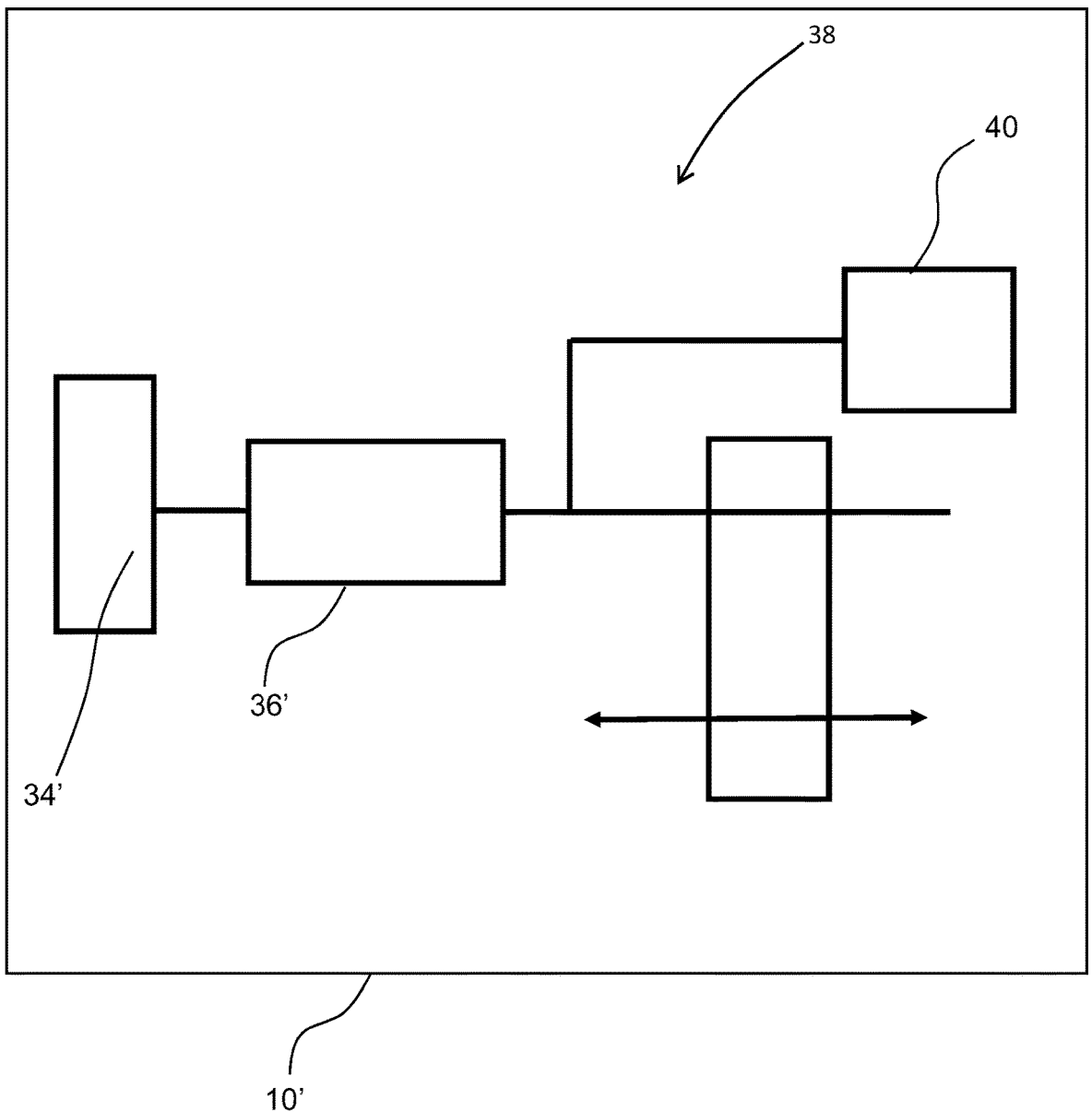
FIG. 6 is a schematic representation of a working machine according to an embodiment of the present teachings.

Referring to FIGS. 3 to 5, the working machine is provided with a control system 50. The control system 50 is configured to provide an alert based on a comparison between a state of charge of the battery 40 and a determined travel energy threshold required to enable the working machine 10 to travel to a charging location C. It will be appreciated that the alert may be provided in the form of an audio and/or visual alert or alarm. In such arrangements, the working machine 10 may be provided with an audio indicator 52 such as a speaker, a bell and/or a horn. Alternatively or additionally, the working machine 10 may be provided with a visual indicator 54 such as a light or a display.

The working machine 10 is provided with a battery management system to monitor the performance of the battery 40. The control system 50 is configured to retrieve data relating to a state of charge of the battery 40 from the battery management system 56 on the working machine 10.

The working machine 10 is provided with a position sensor 58 configured to provide location data in relation to the location of the working machine 10. The control system 50 is configured to retrieve data relating to a location of the working machine 10 from a position sensor 58 on the working machine 10. In some arrangements, the position sensor 58 may include and/or comprise a component of global navigation satellite system (GNSS) such as the global positioning system (GPS), GLONASS or Galileo.

The control system 50 is configured to retrieve data relating to a location of the charging location C. In some arrangements, a further position sensor (not shown) may be provided at the charging location C. In such arrangements, the control system 50 may be configured to retrieve data relating to the charging location C from the further position sensor. Alternatively, the data relating to the charging location C may be stored on a memory 60, and the control system 50 may be configured to retrieve data relating to the charging location C from the memory 60. In alternative arrangements, data relating to the charging location may stored on the memory 60 by storing the location at which the battery 40 was last charged, and the control system 50 may be configured to retrieve data relating to the charging location from the memory 60. It will be appreciated that the memory 60 may be provided on the working machine 10, i.e. it may be a working machine memory, or may be provided at a remote server, i.e. it may be a remote server memory.

Using the data relating to the location of the working machine 10 and the location of the charging location C, a distance (e.g. a straight-line or direct distance) to the charging location C is able to be calculated/determined by the control system 50. The determined travel energy threshold is based on a distance between the location of the working machine 10 and the charging location C.

In some arrangements, the control system 50 may be configured store location data from the position sensor 58 in a memory 60 so as to store the XY coordinates of a route or path P travelled by the working machine 10 from the charging location C for determining the location of the working machine (often referred to as a breadcrumb trail). It will be appreciated that the memory 60 may be provided on the working machine 10, i.e. it may be a working machine memory, or may be provided at a remote server, i.e. it may be a remote server memory. The control system 50 may be configured so as to retrieve the data relating to route P travelled by the working machine 10 from the charging location C from the memory 60. In this way, the return route (i.e. the distance to be travelled) to the charging location C is able to be calculated/determined by the control system 50. The determined travel energy threshold is based on the distance between the location of the working machine 10 and the charging location C.

In some arrangements, the working machine 10 may be provided with a sensor configured to provide data in relation to the altitude of the working machine 10 relative to the charging point. The data relating to the altitude of the working machine 10 may be stored in the memory 60. It will be appreciated that the altitude of the charging point may be stored in the memory 60 when the battery 40 was last charged, or that a further sensor may provide data to the control system 50 of the altitude of the charging location C. It will be appreciated that the memory 60 may be provided on the working machine 10, i.e. it may be a working machine memory, or may be provided at a remote server, i.e. it may be a remote server memory. The control system 50 may be configured so as to retrieve the data relating to the altitude of the working machine 10 relative to the charging location C from the memory 60. In this way, the distance to the charging location C is able to be calculated/determined by the control system 50 incorporating the change in altitude. The determined travel energy threshold may be based on the change in altitude of the working machine 10 and the charging location C. Using the determined distance of the working machine 10 to the charging location C, the control system 50 calculates/determines an energy threshold required to enable the working machine 10 to travel to the charging location C. As discussed above, the control system 50 is configured to provide an alert when the travel energy threshold is substantially equal to the state of charge of the battery 40. This alerts an operator of the electric off-highway working machine of the need to stop performing the current working operation and to return the working machine to the charger. In this way, an operator is alerted when the machine is about to be out of range of the charger at the charge location C.

In some arrangements, the control system 50 may be configured to receive data relating to a plurality of candidate charging locations. The control system 50 may be configured to select or choose one of the candidate charging locations as the charging location C based on one or more parameters. In some embodiments, the control system 50 may calculate a travel energy threshold for each of the plurality of charging locations. In other embodiments, the control system may only calculate the travel energy threshold for the selected charging location C. In such arrangements, the control system 50 may be configured to determine a distance to each candidate charging location, and to choose one of the candidate charging locations as the charging location C based on the determined distances. For example, the control system 50 may be configured to choose the candidate charging location having the minimum determined distance as the charging location C. In such embodiments, the working machine 10 may select a charging location C that requires less energy to travel to said charging location C compared to the remaining candidate charging locations. The control system 50 may determine the distance to each candidate charging location (e.g. a straight-line distance or a distance to be travelled) in a similar manner as described above. In alternative arrangements, the control system 50 may be configured to choose the charging location C from the candidate charging locations based on any suitable criteria or factors.

In some arrangements, the control system 50 may be configured to receive data relating to an altitude of the working machine 10 relative to an altitude of each of the plurality of charging locations. The control system 50 may be configured to determine a travel energy threshold for each of the plurality of charging locations based on the relative altitudes of the working machine 10 and each of the plurality of charging locations. The control system 50 may be configured to select one of the plurality of charging locations as the charging location C based on the altitude of the working machine 10 relative to each of the plurality of charging locations. For example, the control system 50 may be configured to select one of the plurality of charging locations having the closest altitude to the working machine 10, or to select one of the plurality of charging locations having the lowest altitude, as the charging location C. As such, the control system 50 may select one of the plurality of charging locations as the charging location C based on altitude to minimize the energy required for the working machine 10 to travel to the charging location C compared to the remaining charging locations.

Using the determined distance and/or altitude of the working machine 10 and charging location C the control system 50 calculates/determines an energy threshold required to enable the working machine 10 to travel to the charging location C. As discussed above, the control system 50 is configured to provide an alert when the travel energy threshold is substantially equal to the state of charge of the battery 40. This alerts an operator of the electric off-highway working machine of the need to stop performing the current working operation and to return the working machine to the charger. In this way, an operator is alerted when the machine is about to be out of range of the charger at the charge location.

In some embodiments, the control system 50 may be configured to receive data relating to a charging availability for each of the plurality of charging locations. Put another way, the control system 50 may be configured to determine whether each of the multiple charging locations are charging a different working machine (i.e. the charging location is in an active charging state) or if the charging location is not currently charging a working machine (i.e. the charging location is in a rest state). The charging availability indicates whether there is availability at the charging location for charging the working machine 10. The control system 50 may be configured to select one of the plurality of charging locations as the charging location C based on the charging availability for each of the plurality of charging locations. Put another way, the control system 50 may be configured to only select one of the plurality of charging locations as the charging location C that is in a rest state.

It will be appreciated that in some arrangements, the control system 50 may be configured to select one of the plurality of charging locations as the charging location C based on one or more of: the determined distance to each of the plurality of charging locations; the altitude of the working machine relative to each of the plurality of charging locations; the charging rate at each of the plurality of charging locations; and the charging availability for each of the plurality of charging locations. In alternative arrangements, the control system 50 may be configured to choose the charging location C from the plurality of charging locations based on any suitable criteria or factors.

The control system 50 may calculate a travel energy requirement based the distance from the working machine 10 to the charging location C and an estimated energy consumed per unit distance. It will be appreciated that the estimated energy consumed per unit distance may be based on as worst case scenario situation. The estimated energy consumed per unit distance may vary depending on the type of working machine and also depending on the configuration of the working being used for a particular application.

The estimated energy consumed per unit distance for a range of working machines, and for different configurations of each working machine, may be stored on the memory 60. The working machine 10 may comprise an operator input to select a particular configuration of the working machine, and the control system is configured to receive a signal based on the operator selection. It will be appreciated that the memory 60 may be provided on the working machine i.e. it may be a working machine memory, or may be provided at a remote server, i.e. it may be a remote server memory. The control system 50 may be configured so as to retrieve the data relating the estimated energy consumed per unit distance from the memory 60, e.g. based on a selection made by an operator. In some arrangements, the control system 50 may be configured to monitor the electrical energy usage over a predetermined period of time whilst the machine is in a travelling mode (i.e. when the machine 10 is travelling) (e.g. since the battery was last charged) to calculate the estimated energy consumed per unit distance. This helps to tailor the travel energy threshold to the particular configuration of the working machine and the conditions (e.g. ambient temperature, terrain etc.) in which the machine is operation, helping to maximize time on site performing working operations. In such arrangements, the control system may be configured to detect a signal whether the working machine 10 is in a working mode or a travelling mode, and to monitor the electrical energy usage over a predetermined period of time whilst the working machine 10 is in the travelling mode. In some arrangements, the working machine 10 may include a travel speed sensor (not shown), and the control system 50 may detect that the working machine 10 is in a travelling mode when the working machine 10 is travelling above a predetermined travel speed and/or movement of the working machine beyond a predetermined distance in one direction. In this way, the control system 50 may be configured to distinguish between movement of the working machine 10 during a material handling operation and movement of the working machine 10 from a charging location C to a worksite. Additionally or alternatively, the working machine 10 may be configured to detect that the working machine 10 is in the travelling mode by detecting: an orientation or position of an operator seat (e.g. movement between a rearward facing position to a forward facing position); and/or that a ground engaging component (e.g. stabilizer legs or a dozer blade) of the working machine 10 has moved from a ground engaging position to a raised position.

The travel energy threshold at which the control system 50 provides an alert is greater than the calculated travel energy requirement. This additional energy provides an additional safety factor to take account for different route that may need to be taken, and/or differing conditions such as ambient temperature, ground conditions, altitude etc. The travel energy threshold may be in the region of 110-130% of the travel energy requirement, for example approximately 120% of the travel energy requirement. In some arrangements, the working machine may be provided with a temperature sensor configured to provide data in relation to the ambient temperature. In such arrangements, the travel energy threshold may be based on the ambient temperature.

Once the travel energy threshold has been determined/calculated, the control system 50 compares the state of charge of the battery 40 and the travel energy threshold, and provides an alert.

The state of charge of the battery 40 and the travel energy threshold may change from position-to-position as the working machine 10 is operated. For example, the state of charge of the battery 40 decreases during operation of the working machine 10, and the travel energy threshold changes based on the distance of the path to the charging location C destination. The distance/route to the charging location C destination, the travel energy threshold, and the state of charge of the battery 40 may be calculated multiple times during operation of the working machine 10, for example these may be updated periodically or continuously in real-time to enable the comparison to be made. As has been described above, the working machine 10 may be provided with one or more actuatable devices or components. In some arrangements, the control system 50 may be configured to monitor energy usage while performing a working operation and to provide an estimated time remaining before the alert is provided.

The control system 50 has been described above as one comprising a controller that is configured to: receive or retrieve data relating to the charging location C; receive or retrieve data relating to the location of the working machine; determine a distance to the charging location C; determine an energy requirement of the working machine 10 to travel to the charging location C; and to compare the energy requirement to a state of charge of the battery. It will be appreciated that in some arrangements that this processing may be performed on the working machine 10 and in others it may be performed remotely (e.g. at a remote server), and the control system on the working machine 10 may retrieve the data relating to the comparison between the state of charge of the battery and a determined travel energy threshold required to enable the working machine to travel to a charging location C.

In embodiments where the working machine is configured to communicate with a memory at a remote server location, the working machine 10 may be provided with a telemetry module (not shown). The telemetry module may include a transmitter capable of communicating via a cellular radio network using a suitable protocol, such as GPRS, UMTS or LTE, and/or the internet with a server at a remote location, such that operating parameters of the machine may be presented to authorized users. To enable this, the telemetry module may be capable of collecting data from the battery management system regarding the state of the battery, the position sensor, the control system, and the memory on the working machine.

The alert the based on the comparison between a state of charge of the battery 40 and a determined travel energy threshold required to enable the working machine 10 to travel to a charging location C, provides a warning or signal to an operator of the need to return the working machine 10 to a charging location C.

If the working machine 10 continues to be operated once the alert has been provided, the control system 50 may be configured to degrade operation or control of the working machine. This degradation of the operation or control of the working machine 10 provides a further indication or warning to an operator that the working machine 10 needs to be returned to a charging location C. In one arrangement, the control system may be configured to activate a restricted operation mode of the working machine when the state of charge is below the energy requirement by a first predetermined amount. Put another way, the control system may be configured to activate a restricted operation mode of the working machine when the state of charge is below a second energy threshold, which is lower than the travel energy threshold. Restricting operation of the working machine reduces the machine's energy usage and enables the working machine to travel to the charge location even when the state of charge of the battery is below the energy requirement. In the restricted operation mode, the speed of travel of the working may be restricted, and/or operation of the hydraulically operated implements may be restricted or prevented.

Further use of the working machine once operation or control of the working machine 10 has been degraded may result in the control system 50 activating a limp home operation mode. The limp home operation mode may be activated when the state of charge is below the energy requirement by a second predetermined amount greater than the first predetermined amount and/or when the state of charge is at a predetermined level. Put another way, the control system may be configured to activate a limp home operation mode of the working machine when the state of charge is below a third energy threshold, which is lower than the travel and second energy thresholds. In the limp home operation mode, the RPM of the electric motor may be fixed at a relatively low RPM and/or one or more functions of the working machine (e.g. heating, air conditioning etc.) may be switched off. Put another way, in the limp home operation mode, only basic operation of the working machine is possible, thus reducing energy usage. In this way, the working machine reduces the machine's energy usage and enables the working machine to travel to the charge location even when the state of charge of the battery is below the energy requirement. Moreover, activation of the limp home operation mode provides a further warning to an operator of the working machine 10 of the need to return the working machine 10 to the charging location C.

Referring to FIGS. 6 to 9, a further embodiment of the teachings includes a working machine 10'.

It will be appreciated that the working machine 10'. The working machine 10' shares many of the same features as the working machine 10 described above in relation to FIGS. 1 to 5. In the illustrated embodiment of FIG. 6, however, instead of a battery, the working machine 10' includes an energy source in the form of a fuel tank 34' for storing hydrogen fuel. The working machine 10' includes a prime mover in the form of a hydrogen internal combustion engine 36' configured so as to be supplied with hydrogen fuel from the fuel tank 34'. The internal combustion engine 36' is configured to drive the ground engaging structure 32 to propel the working machine 10'. The internal combustion engine 36' is also configured to drive the hydraulic pump 40 to power the actuatable devices. In alternative arrangements, the working machine 10' may include a prime mover which includes an electric motor arrangement similar to that shown in FIG. 2, but powered by a hydrogen fuel cell configured to be supplied with hydrogen fuel from the fuel tank 34'.

Figure 7:
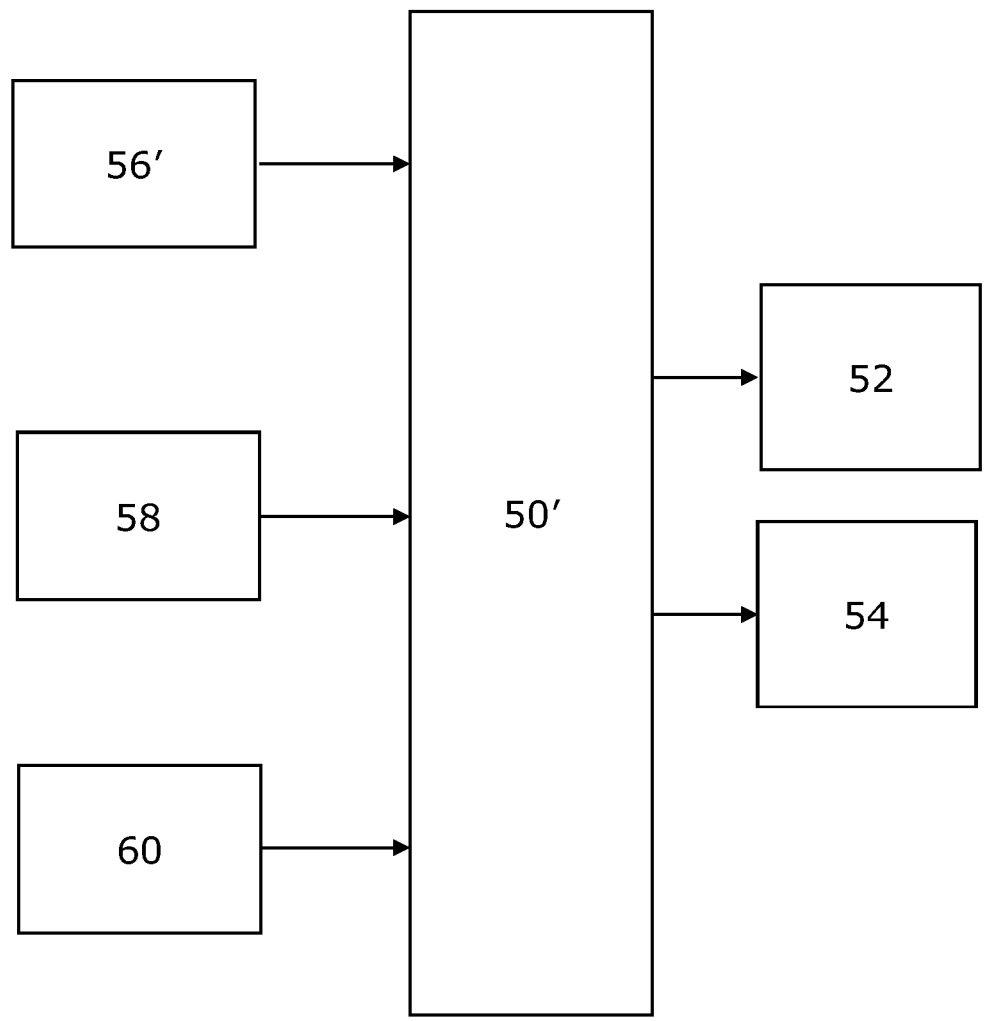
FIG. 7 is a block diagram of a control system of the working machine of FIG. 6.

Referring to FIG. 7, the working machine 10' is provided with a control system 50'. It will be appreciated that the control system 50' may share any of the features described in relation to the control system 50 of FIG. 3 described above.

In a similar manner as the control system 50, the control system 50' is configured to: receive data relating to a charging location C' for refuelling the fuel tank 34' with hydrogen fuel; receive data relating to a location of the working machine 10'; and calculate a travel energy threshold to enable the working machine 10' to travel to the charging location C'. In the present embodiment, the travel energy threshold corresponds to a fuel level threshold of the fuel tank 34'. In the present embodiment, the fuel level threshold corresponds to a quantity (e.g. volume or mass) of hydrogen fuel required to enable the working machine 10 to travel to the charging location C'. It will be appreciated that the control system 50' helps to prevent or reduce the likelihood of a working machine depleting its source of energy before reaching a charging location.

The control system 50' is configured to provide an alert based on a comparison between a fuel level of the fuel tank 34' and the fuel level threshold required to enable the working machine 10 to travel to a charging location C'. In the present embodiment, the charging location C' is configured to charge the fuel tank 34' with hydrogen fuel (i.e. refuel the fuel tank 34' with hydrogen fuel).

In some embodiments, the working machine 10' may be provided with a hydrogen management system 56' to monitor the fuel tank 34'. The control system 50' is configured to retrieve data relating to the fuel level of the fuel tank 34' from the hydrogen management system 56' on the working machine 10'. The data relating to the fuel level of the fuel tank 34' may include the pressure of hydrogen fuel within the fuel tank 34', the quantity (e.g. volume and/or mass) of the hydrogen fuel remaining in the fuel tank 34', and/or the quantity of the hydrogen fuel remaining in the fuel tank 34' as a proportion of the maximum capacity of the fuel tank 34', for example.

The control system 50' is configured to compare the fuel level threshold to the level of the fuel tank 34', and provide an alert when the level of the fuel tank 34' is equal, e.g. substantially equal, to the fuel level threshold. This alerts an operator of the hydrogen-powered off-highway working machine 10' of the need to stop performing the current working operation and to move the working machine 10' to the charging location C'. In this way, an operator is alerted when the machine is about to be out of range of the charging location C'. In some arrangements, the control system 50' may provide the alert when the level of the fuel tank 34' is equal to or less than the fuel level threshold.

In some arrangements, a further position sensor (not shown) may be provided at the charging location C. In such arrangements, the control system 50' may be configured to retrieve data relating to the charging location C from the further position sensor. Alternatively, the data relating to the charging location C may be stored on a memory 60, and the control system 50' may be configured to retrieve data relating to the charging location C from the memory 60. In alternative arrangements, data relating to the charging location may stored on the memory 60 by storing the location at which the working machine 10' was last charged, and the control system 50' may be configured to retrieve data relating to the charging location from the memory 60. It will be appreciated that the memory 60 may be provided on the working machine 10', i.e. it may be a working machine memory, or may be provided at a remote server, i.e. it may be a remote server memory.

In some arrangements, the control system 50' is configured to determine a distance to the charging location C'. For example, the control system 50' may determine the distance to the charging location C' in the same manner as the control system 50 described above. The control system 50' is configured to calculate the fuel level threshold required based on the determined distance to the charging location C'.

Similar to the control system 50, the control system 50' calculates a travel fuel requirement based the distance from the working machine 10' to the charging location C' and an estimated fuel consumed per unit distance. It will be appreciated that the estimated fuel consumed per unit distance may be based on as worst case scenario situation. The travel fuel threshold at which the control system 50' provides an alert is greater than the calculated travel fuel requirement. The travel fuel threshold may be in the region of 110-130% of the travel fuel requirement, for example approximately 120% of the travel fuel requirement.

The control system 50' may be configured so as to retrieve the data relating the estimated fuel consumed per unit distance from the memory 60, e.g. based on a selection made by an operator. In some arrangements, the control system 50' may be configured to monitor the fuel usage over a predetermined period of time whilst the machine is in a travelling mode (i.e. when the machine 10' is travelling) (e.g. since the fuel tank 34' was last charged with hydrogen) to calculate the estimated fuel consumed per unit distance. The control system 50' may be configured to monitor fuel usage of the working machine 10' in a working mode, and to provide an estimated time remaining before the alert is provided.

The fuel level of the fuel tank 34' and the fuel level threshold may change from position-to-position as the working machine 10' is operated. For example, the fuel level of the fuel tank 34' decreases during operation of the working machine 10', and the fuel level threshold changes based on the distance of the path to the charging location C' destination. The distance/route to the charging location C' destination, the fuel level threshold, and the fuel level of the fuel tank 34' may be calculated multiple times during operation of the working machine 10', for example these may be updated periodically or continuously in real-time to enable the comparison to be made.

The alert based on the comparison between the fuel level of the fuel tank 34' and the determined fuel level threshold required to enable the working machine 10' to travel to the charging location C', provides a warning or signal to an operator of the need to move the working machine 10' to the charging location C'.

If the working machine 10' continues to be operated once the alert has been provided, the control system 50' may be configured to degrade operation or control of the working machine 10'. In one arrangement, the control system 50' may be configured to activate a restricted operation mode of the working machine 10' when the fuel level of the fuel tank 34' is below the fuel level threshold by a first predetermined amount. Restricting operation of the working machine reduces the machine's fuel consumption and enables the working machine 10' to travel to the charging location C' even when the fuel level of the fuel tank 34' is below the fuel level threshold. In the restricted operation mode, the speed of travel of the working may be restricted, and/or operation of the hydraulically operated implements may be restricted or prevented.

Further use of the working machine 10' once operation or control of the working machine 10' has been degraded may result in the control system 50' activating a limp home operation mode. The limp home operation mode may be activated when the fuel level of the fuel tank 34' is below the fuel level threshold by a second predetermined amount greater than the first predetermined amount and/or when the fuel level of the fuel tank 34' is at a predetermined level. In the limp home operation mode, the RPM of the internal combustion engine 36' may be fixed at a relatively low RPM (e.g. an idling speed) and/or one or more functions of the working machine 10' (e.g. heating, air conditioning etc.) may be switched off, and/or operation of the machine's actuatable devices may be prevented.

Figure 8:
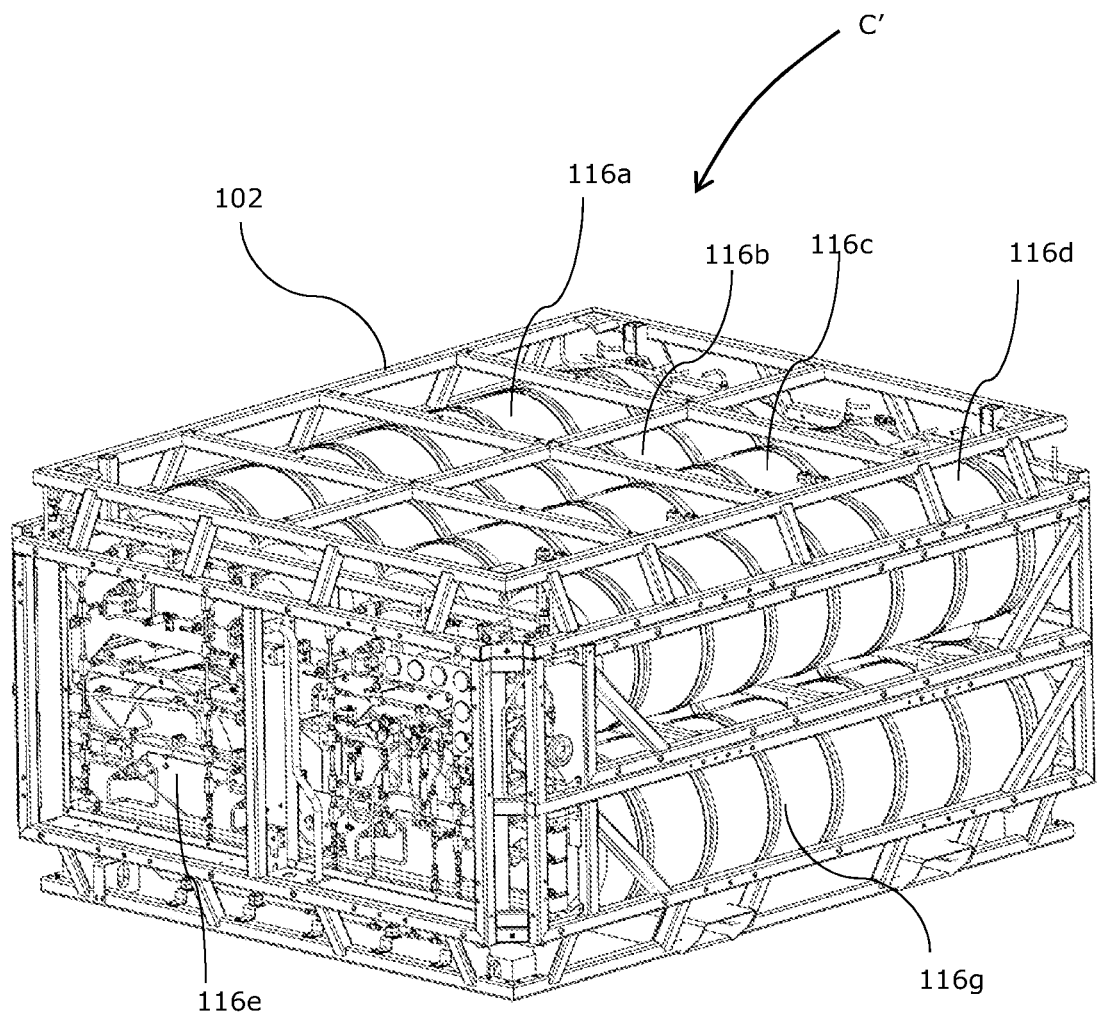
FIG. 8 is an isometric view of a charging location.
Figure 9:
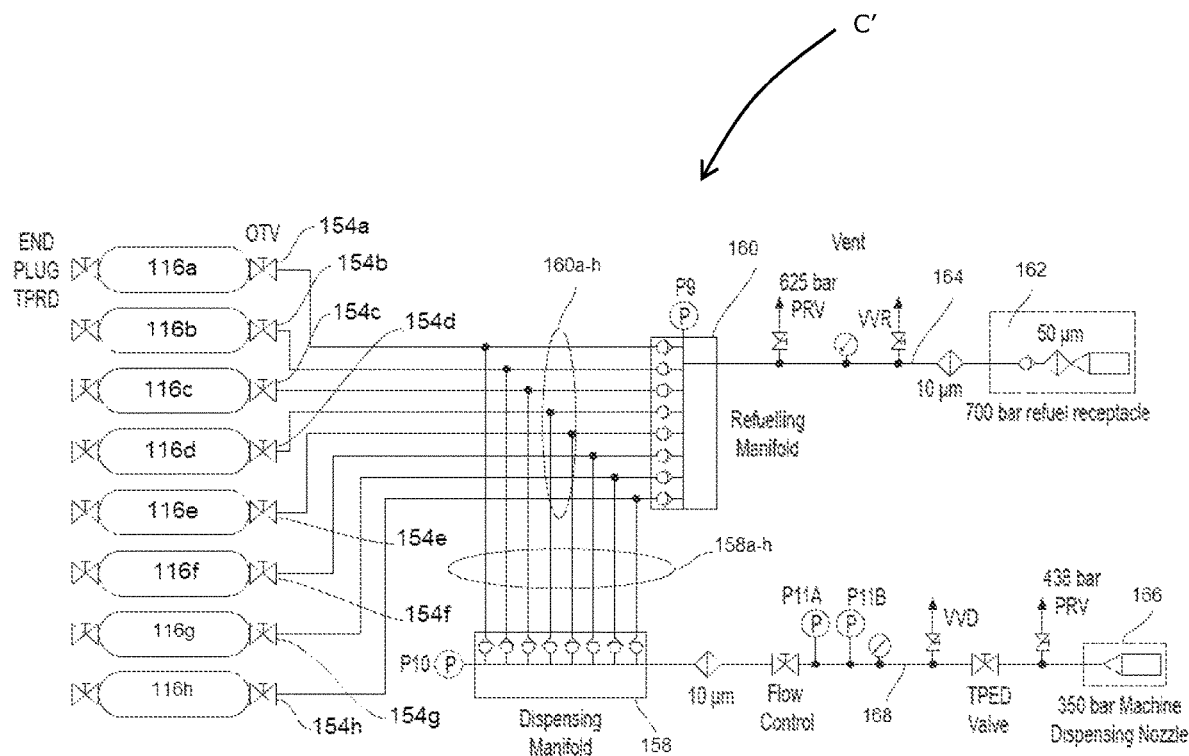
FIG. 9 is a schematic view of the charging location of FIG. 8.

FIGS. 8 and 9 show an exemplary charging location C', which includes an arrangement of eight charging tanks 116a-h held within an enclosure 102. Each charging tank 116a-h contains hydrogen at a particular pressure. In alternative arrangements, the charging location C may include any number of charging tanks, e.g. less than eight (e.g. one or more) or more than eight.

As can be best seen in FIG. 9, the charging location C' includes a control valve or tank valve 154a-h, for each charging tank 116a-h, a refilling manifold 160 and a dispensing (or refuelling) manifold 158. Respective fluid lines 160a-h, 158a-h connect each of the tank valves 154 to the manifolds in parallel such that each tank can be charged (refilled) and discharged (to refuel a vehicle) simultaneously upon control of the valves. Also shown is a charging inlet 162 which connects to the charging manifold 160 via an inlet fluid line 164, and a discharging outlet 166 which is connected to the discharge manifold 158 via an outlet fluid line 168. In addition to providing the basic switching operation, the tank valves 154a-h may also comprise one or more additional functions. For example, the tank valves 154a-h may include one or more sensors to monitor the status of the tanks such as a pressure sensor.

The fuel tank 34' of the working machine 10' is refuelled with hydrogen from one or more of the charging tanks 116a-h via the discharging outlet 166. For example, the fuel tank 34' may be charged from one of the charging tanks 116a-h, two or more of the charging tanks 116a-h sequentially (i.e. one tank at any one time), or two or more of the charging tanks 116a-h simultaneously.

Each charging tank 116a-h can only refuel the fuel tank 34' with hydrogen whilst the pressure within the charging tank 116a-h is greater than or equal to the pressure within the fuel tank 34'. Otherwise, that charging tank is unable to charge the fuel tank 34'. In the illustrated embodiment, the fuel tank 34' is rated to store hydrogen at a maximum pressure of 350 bar. As such, unless the pressure within a given one of the charging tanks 116a-h is greater than or equal to 350 bar, that charging tank 116a-h is unable to fully refuel the fuel tank 34'. Moreover, the rate at which a given one of the charging tanks 116a-h refuels the fuel tank 34' (i.e. the charging rate) is dependent on the pressure difference between the pressure in that charging tank 116a-h and the pressure in the fuel tank 34'; i.e. the higher the pressure difference, the higher the charging rate. Therefore, the charging tanks 116a-h will have different charging rates, and some may not be able to fully charge the fuel tank 34' with hydrogen.

In some arrangements, the control system 50' is configured to receive data relating to one or more charging parameters indicative of a charging rate at the charging location C'. For example, in the present embodiment, the control system 50' may receive one charging parameter per charging tank 116a-h indicating the charging rate for that charging tank 116a-h. In alternative arrangements, the charging parameter may be based on an average pressure of two or more (or all) of the charging tanks 116a-h at the charging location C'. In such alternative arrangements, the charging location C' may have a single charging parameter regardless of the number of charging tanks.

In a similar manner to the control system 50 shown in FIG. 3, the control system 50' may be configured to receive data relating to a plurality of charging locations, and to select or choose one of the plurality of charging locations as the charging location C' based on one or more parameters of criteria. For example, the control system 50' may select one of the plurality of charging locations as the charging location C' based on one or more of: the determined distance to each of the plurality of charging locations; the altitude of the working machine relative to each of the plurality of charging locations; the charging rate at each of the plurality of charging locations; the hydrogen fuel pressure at each of the plurality of charging locations; and the charging availability for each of the plurality of charging locations.

In some embodiments, the control system 50' may calculate a travel energy threshold for each of the plurality of charging locations. In other embodiments, the control system may only calculate the travel energy threshold for the selected charging location C. In such arrangements, the control system 50' may be configured to determine a distance to each candidate charging location, and to choose one of the candidate charging locations as the charging location C' based on the determined distances. For example, the control system 50' may be configured to choose the candidate charging location having the minimum determined distance as the charging location C'. In such embodiments, the control system 50' may select a charging location C' that requires less energy to travel to said charging location C' compared to the remaining candidate charging locations. The control system 50' may determine the distance to each candidate charging location (e.g. a straight-line distance or a distance to be travelled) in a similar manner as described above. In alternative arrangements, the control system 50' may be configured to choose the charging location C' from the candidate charging locations based on any suitable criteria or factors.

In some arrangements, the control system 50' may be configured to receive data relating to an altitude of the working machine 10' relative to an altitude of each of the plurality of charging locations. The control system 50' may be configured to determine a travel energy threshold for each of the plurality of charging locations based on the relative altitudes of the working machine 10' and each of the plurality of charging locations. The control system 50' may be configured to select one of the plurality of charging locations as the charging location C' based on the altitude of the working machine 10' relative to each of the plurality of charging locations. For example, the control system 50' may be configured to select one of the plurality of charging locations having the closest altitude to the working machine 10', or to select one of the plurality of charging locations having the lowest altitude, as the charging location C'. As such, the control system 50' may select one of the plurality of charging locations as the charging location C' based on altitude to minimize the energy required for the working machine 10' to travel to the charging location C' compared to the remaining charging locations.

Using the determined distance and/or altitude of the working machine 10' and charging location C' the control system 50' calculates/determines an energy threshold required to enable the working machine 10' to travel to the charging location C'. As discussed above, the control system 50' is configured to provide an alert when the travel energy threshold is substantially equal to the state of charge of the battery 40. This alerts an operator of the electric off-highway working machine of the need to stop performing the current working operation and to return the working machine to the charger. In this way, an operator is alerted when the machine is about to be out of range of the charger at the charge location.

In some embodiments, the control system 50' may be configured to receive data relating to a charging availability for each of the plurality of charging locations. Put another way, the control system 50' may be configured to determine whether each of the multiple charging locations are charging a different working machine (i.e. the charging location is in an active charging state) or if the charging location is not currently charging a working machine (i.e. the charging location is in a rest state). The charging availability indicates whether there is availability at the charging location for charging the working machine 10'. The control system 50' may be configured to select one of the plurality of charging locations as the charging location C' based on the charging availability for each of the plurality of charging locations. Put another way, the control system 50' may be configured to only select one of the plurality of charging locations as the charging location C' that is in a rest state.

In some embodiments, the control system 50' may be configured to select one of the plurality of charging locations as the charging location C' based on the charging rate at each of the plurality of charging locations. For example, the control system 50' may be configured to select one of the plurality of charging locations having the highest or quickest charging rate as the charging location C'.

In some arrangements, the control system 50' is configured to receive data relating to one or more hydrogen fuel pressures at the charging location C'. The control system 50' may be configured to select one of the plurality of charging locations as the charging location C' based on the hydrogen fuel pressures at each of the plurality of charging locations. For example, the control system 50' may be configured to select one of the plurality of charging locations having the highest hydrogen fuel pressures as the charging location C'. For example, in an embodiment, the control system 50' receives data relating to the hydrogen fuel pressure for each charging tank 116a-h. The control system 50' may receive the one or more hydrogen fuel pressures from a remote server, e.g. which receives each hydrogen fuel pressure from a pressure sensor at the charging location C'.

In some arrangements, the control system 50' may be configured to compare the one or more hydrogen fuel pressures at the charging location C' to a hydrogen fuel pressure of the fuel tank 34' of the working machine 10'. From the comparison of each hydrogen fuel pressure at the charging location C' and hydrogen fuel pressure of the fuel tank 34', the control system 50' may determine parameters indicative of a charging rate and/or a quantity of hydrogen that the charging location C' can refuel the fuel tank 34'.

The control system 50' may be configured to select one of the plurality of charging locations as the charging location C based on the relative pressures between the working machine 10' and the pressure at each of the plurality of charging locations. For example, the control system 50' may be configured to discount any of the plurality of charging locations from the selection which have hydrogen fuel pressures less than (e.g. less than or equal to) the hydrogen fuel pressure of the fuel tank 34'. The control system 50' may determine the one or more charging parameters based on the comparison of the one or more hydrogen fuel pressures at the charging location C' to the hydrogen fuel pressure of the fuel tank 34', e.g. via a look-up table or map (e.g. stored in the memory 60).

The control system 50' may provide a visual and/or audible output based on one or more of the charging parameters (e.g. information related to the highest charging rate, and/or the corresponding charging tank). As such, an operator of the working machine 10' may be provided with an indication of how long it may take to refuel the fuel tank 34' with hydrogen at the charging location C'.

In a similar manner to the control system 50 shown in FIG. 3, the control system 50' may be configured to receive data relating to a plurality of charging locations, and choose one of the plurality of charging locations as the charging location C' for which the fuel level threshold is calculated, for example based on one or more of: the determined distance to each of the plurality of charging locations; the altitude of the working machine relative to each of the plurality of charging locations; the charging rate at each of the plurality of charging locations; the hydrogen fuel pressure at each of the plurality of charging locations; and the charging availability for each of the plurality of charging locations.

In some arrangements, the control system 50' may be configured to select one of the plurality of charging locations as the charging location C' based on the determined distance to each of the plurality of charging locations, and one or more of: the altitude of the working machine relative to each of the plurality of charging locations; the charging rate at each of the plurality of charging locations; the hydrogen fuel pressure at each of the plurality of charging locations; and the charging availability for each of the plurality of charging locations. In such arrangements, the control system 50' may be configured to select one of the plurality of charging locations as the charging location C' based on the determined distance to each of the plurality of charging locations being less than a distance threshold. The distance threshold may correspond to a maximum distance the working machine 10' can travel according to the fuel level of the fuel tank 34' or a predetermined proportion of said maximum distance (e.g. 50% of the maximum distance). As an example, the control system 50' may be configured to select one of the plurality of charging locations as the charging location C' for which the determined distance thereto is less than the determined distance threshold, and further based on: the altitude of the working machine relative to each of the plurality of charging locations (e.g. smallest relative altitude); the charging rate at each of the plurality of charging locations (e.g. maximum charging rate); and/or the hydrogen fuel pressure at each of the plurality of charging locations (e.g. maximum hydrogen fuel pressure).

Although the teachings have been described above with reference to one or more preferred embodiments, it will be appreciated that various changes or modifications may be made without departing from the scope as defined in the appended claims.

The invention claimed is:

1. A control system for an electric off-highway working machine comprising a ground engaging propulsion structure for propelling the working machine, a body supported on the ground engaging propulsion structure, a drive arrangement comprising a battery, an electric motor configured to be powered by the battery, and a transmission operable to transmit drive from the electric motor to the ground engaging propulsion structure, the control system comprising a controller configured to:
   receive data relating to a charging location;
   receive data relating to a location of the working machine;
   calculate a travel energy threshold required to enable the working machine to travel to the charging location;
   receive data relating to a state of charge of the battery of the working machine;
   compare the travel energy threshold to the state of the charge of the battery;
   provide an alert when the state of the charge of the battery is equal to the travel energy threshold;
   activate a restricted operation mode of the working machine when the state of the charge of the battery is below the travel energy threshold by a first predetermined amount; and
   activate a limp home operation mode when the state of the charge of the battery is below the travel energy threshold by a second predetermined amount greater than the first predetermined amount.

2. The control system according to claim 1, configured to determine a distance to the charging location, and to calculate the travel energy threshold required based on the determined distance to the charging location.

3. The control system according to claim 1, configured to receive data relating to the location of the working machine from a position sensor provided on the working machine.

4. The control system according to claim 3, configured to store XY coordinates of a route travelled by the working machine from the charging location, and to determine the distance to the charging location based on the route travelled.

5. The control system according to claim 3, configured to receive data relating to the altitude of the working machine relative to an altitude of the charging point, and to determine the distance to the charging location based on the based on the altitude of the working machine relative to the altitude of the charging point.

6. The control system according claim 1, configured to receive data relating to a plurality of charging locations, and select one of the plurality of charging locations as the charging location.

7. The control system according to claim 6, wherein the control system is configured to select one of the plurality of charging locations as the charging location based on one or more of: a distance to each of the plurality of charging locations; an altitude of the working machine relative to each of the plurality of charging locations; and a charging rate at each of the plurality of charging locations.

8. The control system according to claim 6, configured to receive data relating to each of the plurality of charging locations being in an active charging state or a rest state, and to select one of the plurality of charging locations as the charging location based on the active state or rest state of each of the plurality of charging locations.

9. The control system according to claim 1, configured to determine a travel energy requirement based on the distance to the charging location and an estimated energy consumed per unit distance, and wherein the travel energy threshold is based on, and is greater than, the travel energy requirement.

10. The control system according to claim 9, wherein the travel energy threshold is in the region of 110-130% of the travel energy requirement.

11. The control system according to claim 9, configured to retrieve data relating to the estimated energy consumed per unit distance from a memory for a configuration of the working machine selected by an operator, and/or configured to monitor an electrical energy usage of the working machine in a travelling mode over a predetermined period of time, and to calculate the estimated energy consumed per unit distance the electrical energy usage.

12. The control system according to claim 1, configured to monitor energy usage of the working machine in a working mode, and to provide an estimated time remaining before the alert is provided.

13. The control system according to claim 12, wherein the control system is configured to detect a signal whether the working machine is in a working mode based on one or more of: detecting when the working machine is travelling below a predetermined travel speed; an orientation or position of an operator seat; and/or detecting a ground engaging component of the working machine has moved to a ground engaging position from a raised position.

14. The control system according to claim 1, configured to receive data relating to the charging location via a global navigation satellite system (GNSS) such as the global positioning system (GPS).

15. The control system according to claim 1, configured to receive data relating to the charging location by retrieving charging location data stored on a memory when the battery of the working machine was last charged.

16. The control system according to claim 1, wherein the working machine comprises one or more hydraulically actuatable working implements for performing working operations, and wherein the control system is configured to restrict or prevent operation of the working implements in the restricted mode of operation, and/or wherein a speed of travel of the working machine is restricted in the restricted operation mode.

17. The control system according to claim 1, wherein an RPM of the electric motor is fixed at a relatively low RPM in the limp home operation mode, and/or wherein one or more functions of the working machine, such as heating and air conditioning, are switched off in the limp home operation mode.

18. A method for providing an alert for an electric off-highway working machine comprising a ground engaging propulsion structure for propelling the working machine, a body supported on the ground engaging propulsion structure, a drive arrangement comprising a battery, an electric motor configured to be powered by the battery, and a transmission operable to transmit drive from the electric motor to the ground engaging propulsion structure, the method comprising:
   receiving data relating to a charging location;
   receiving data relating to a location of the working machine;
   determining a distance to the charging location;
   calculating a travel energy threshold required to enable the working machine to travel to the charging location;
   receiving data relating to a state of charge of the battery of the working machine;
   comparing the travel energy threshold to the state of the charge of the battery;
   providing an alert when the state of the charge of the battery is equal to the travel energy threshold;
   activating a restricted operation mode of the working machine when the state of the charge of the battery is below the travel energy threshold by a first predetermined amount; and
   activating a limp home operation mode when the state of the charge of the battery is below the travel energy threshold by a second predetermined amount greater than the first predetermined amount.

19. A control system for an electric off-highway working machine comprising a ground engaging propulsion structure for propelling the working machine, a body supported on the ground engaging propulsion structure, a drive arrangement comprising a battery, an electric motor configured to be powered by the battery, and a transmission operable to transmit drive from the electric motor to the ground engaging propulsion structure, the control system comprising a controller configured to:
   receive data relating to a charging location;
   receive data relating to a location of the working machine;
   calculate a travel energy threshold required to enable the working machine to travel to the charging location;
   receive data relating to a state of charge of the battery of the working machine;
   compare the travel energy threshold to the state of the charge of the battery;
   provide an alert when the state of charge of the battery is equal to the travel energy threshold; and
   detect a signal indicating whether the working machine is in a working mode based on one or more of detecting when the working machine is travelling below a predetermined travel speed, an orientation or position of an operator seat, and/or detecting a ground engaging component of the working machine has moved to a ground engaging position from a raised position; and
   monitor energy usage of the working machine in the working mode, and to provide an estimated time remaining before the alert is provided.

* * * * *